(12) United States Patent
Chiang

(10) Patent No.: US 9,361,839 B2
(45) Date of Patent: Jun. 7, 2016

(54) DOUBLE-VISION DISPLAY DEVICE AND METHOD FOR DRIVING THE SAME

(71) Applicant: BOE Technology Group Co., Ltd., Beijing (CN)

(72) Inventor: Lin Chia Chiang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 3 days.

(21) Appl. No.: 14/546,178

(22) Filed: Nov. 18, 2014

(65) Prior Publication Data

US 2016/0012785 A1    Jan. 14, 2016

(30) Foreign Application Priority Data

Jul. 10, 2014  (CN) .......................... 2014 1 0327972

(51) Int. Cl.
| | |
|---|---|
| *G09G 3/36* | (2006.01) |
| *G06F 3/041* | (2006.01) |
| *G09G 3/00* | (2006.01) |
| *G09G 5/14* | (2006.01) |

(52) U.S. Cl.
CPC .............. *G09G 3/364* (2013.01); *G06F 3/041* (2013.01); *G09G 3/003* (2013.01); *G09G 5/14* (2013.01); *G09G 2300/0443* (2013.01)

(58) Field of Classification Search
CPC .............. G09G 3/3607; G09G 3/364; G09G 2300/0443; G09G 2340/0457; G06F 3/041; G02B 27/22–27/225; H04N 13/0402–13/042
See application file for complete search history.

(56) References Cited

U.S. PATENT DOCUMENTS

| 6,757,422 B1* | 6/2004 | Suzuki ............... G02B 27/0093 348/42 |
|---|---|---|
| 2008/0001849 A1 | 1/2008 | Jin et al. |
| 2012/0057228 A1* | 3/2012 | Okamoto ........... G02B 27/2214 359/462 |

FOREIGN PATENT DOCUMENTS

| CN | 1912704 A | 2/2007 |
|---|---|---|
| CN | 1913648 A | 2/2007 |
| CN | 101900886 A | 12/2010 |
| CN | 201673311 U | 12/2010 |
| CN | 102193200 A | 9/2011 |
| JP | 2011-43623 A | 3/2011 |

OTHER PUBLICATIONS

First Office Action, including Search Report, for Chinese Patent Application No. 201410327972.1, dated Jan. 27, 2016, 9 pages.

* cited by examiner

*Primary Examiner* — Liliana Cerullo
(74) *Attorney, Agent, or Firm* — Westman, Champlin & Koehler, P.A.

(57) ABSTRACT

Embodiments of the present invention provide a double-vision display device comprising a display panel and a grating, wherein the display panel includes a plurality of sub-pixels, and, the grating includes light shading regions and light transmittance regions alternately arranged in a first direction. A distance between midlines of two adjacent ones of the light transmittance regions in each row of the light transmittance regions along the first direction is at least four times as large as a length of one of the sub-pixels along the first direction. Meanwhile, embodiments of the present invention also provide a method for driving the abovementioned double-vision display device. With the abovementioned double-vision display device and the method for driving the same, the double-vision display function is guaranteed while allowing a greater distance between a plane where the grating is located and a plane where the sub-pixels are located.

12 Claims, 5 Drawing Sheets

DOUBLE-VISION DISPLAY DEVICE AND METHOD FOR DRIVING THE SAME

CROSS-REFERENCE TO RELATED APPLICATION

This application claims the benefit of Chinese Patent Application No. 201410327972.1 filed on Jul. 10, 2014 in the State Intellectual Property Office of China, the whole disclosure of which is incorporated herein by reference.

BACKGROUND OF THE INVENTION

1. Field of the Invention

The present invention relates to display technology, and more particularly, to a double-vision display device and a method for driving the same.

2. Description of the Related Art

Double-vision displaying is a display technology by which different images are viewed from two sides (for example, left and right sides) of one display device. As shown in FIG. 1, conventional double-vision display device mainly is constructed by disposing the grating 12 onto the display screen 11. The grating 12 includes light shading regions and light transmittance regions alternately arranged, and the display screen 11 includes first display subzones 111 and second display subzones 112 alternately arranged, wherein the transmittance regions go across the adjacent first 111 and second 112 display subzones. The sub-pixels within the second display subzones 112 only can be seen when viewing the display device from X side, the sub-pixels within the first display subzones 111 only can be seen when viewing the display device from Y side, and, crosstalk zones among the first display subzones 111 and the second display subzones 112 are occurred between the X side and the Y side. Different views can be seen from the X side and the Y side by applying different display signals to the sub-pixels within the first display subzones 111 and those within the second display subzones 112, respectively.

In order to achieve a double-vision displaying, distance between a plane where the grating 12 is in and a pixel plane (which is a plane where these sub-pixels are arranged, and also which is a plane where the first display subzones 111 and the second display subzones 112 are arranged) where the display screen 11 is in should be short. This is because if the distance between the plane where the grating 12 is in and the pixel plane where the display screen 11 is in is large, when viewing the display device from X side, these sub-pixels, which are closer to Y side than X side, within the first display subzone 111 adjacent to the second display subzone 112 can be seen while these sub-pixels within the second display subzone 112 are seen, thereby resulting in images displayed within the second display subzone 112 vague. In like manner, when viewing the display device from Y side, these sub-pixels, which are closer to X side than Y side, within the second display subzone 112 adjacent to the first display subzone 111 can be seen while these sub-pixels within the first display subzone 111 are seen, thereby resulting in images displayed within the first display subzone 111 vague. That is, phenomenon that these sub-pixels within different display subzones are seen from any side are effectively avoided only when there is a short distance between the plane where the grating 12 is in and the pixel plane where the display screen 11 is in, ensuring that only the sub-pixels within the same display subzone are seen from any side.

Generally, the distance between the plane where the grating 12 is in and the pixel plane where the display screen 11 is in is required to be 200 μm or less, which requires a glass substrate between the plane where the grating 12 is in and the pixel plane where the display screen 11 is in to have a thickness of 200 μm or less. However, the glass substrate used in the display device usually has a thickness of more than 200 μm (generally, 500 μm~700 μm), as a result, thickness of the glass substrate is required to be reduced. However, manufacturing of a thinner glass substrate not only directly results in an increase in difficulty of manufacturing of the glass substrate, but manufacturing of various displaying components on the thinner substrate also brings great difficulty on manufacturing of the display screen.

SUMMARY OF THE INVENTION

At least one object of the present invention is to provide a double-vision display device, which has a reduced difficulty of manufacturing.

Another object of the present invention is to provide a method for driving a double-vision display device, by which a reduced difficulty of manufacturing the double-vision display device is achieved.

According to one aspect of the present invention, there is provided a double-vision display device, comprising: a display panel that includes a plurality of sub-pixels and a grating that includes light shading regions and light transmittance regions alternately arranged in a first direction; wherein a distance between midlines of two adjacent ones of the light transmittance regions in each row of the light transmittance regions along the first direction is at least four times as large as a length of one of the sub-pixels along the first direction.

According to another aspect of the present invention, there is provided a method for driving the abovementioned double-vision display device, the method comprising:

applying a display signal that belongs to a first view and a display signal that belongs to a second view to the double-vision display device, such that, the double-vision display device includes first and second display subzones alternately arranged in the first direction, wherein each of the display subzones includes a plurality of sub-pixels;

wherein, within every display subzone, each row of sub-pixels along the first direction includes at least two sub-pixels; and wherein the display signal that belongs to the first view is used for driving the first display subzones to display the first view, and the display signal that belongs to the second view is used for driving the second display subzones to display the second view.

BRIEF DESCRIPTION OF THE DRAWINGS

The above and other features of the present invention will become more apparent by describing in detail exemplary embodiments thereof with reference to the accompanying drawings, in which:

FIG. 7 is a view showing a fourth implementation of the first arrangement of these sub-pixels in the double-vision display device according to an embodiment of the present invention;

FIG. 8 is a second arrangement diagram of these sub-pixels in a double-vision display device according to an embodiment of the present invention;

DETAILED DESCRIPTION OF PREFERRED EMBODIMENTS OF THE INVENTION

Figure 1:
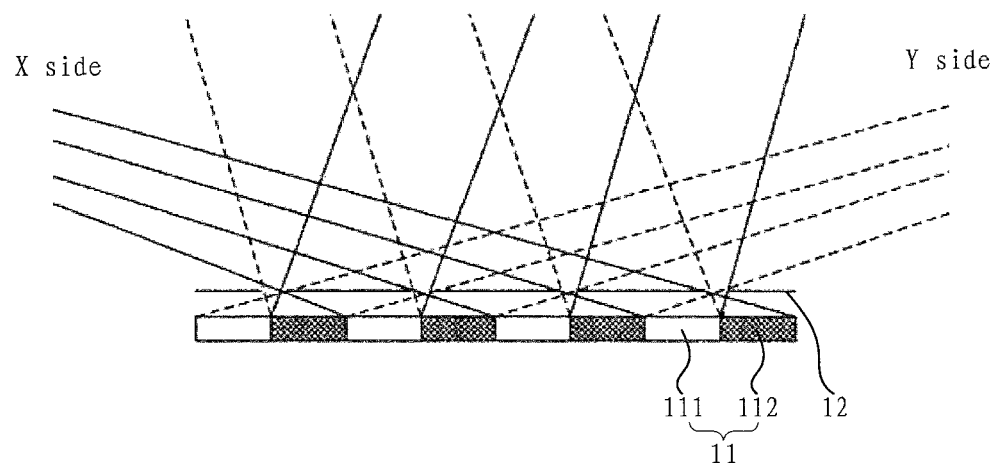
FIG. 1 is a beam path diagram of a conventional double-vision display device.

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 10:
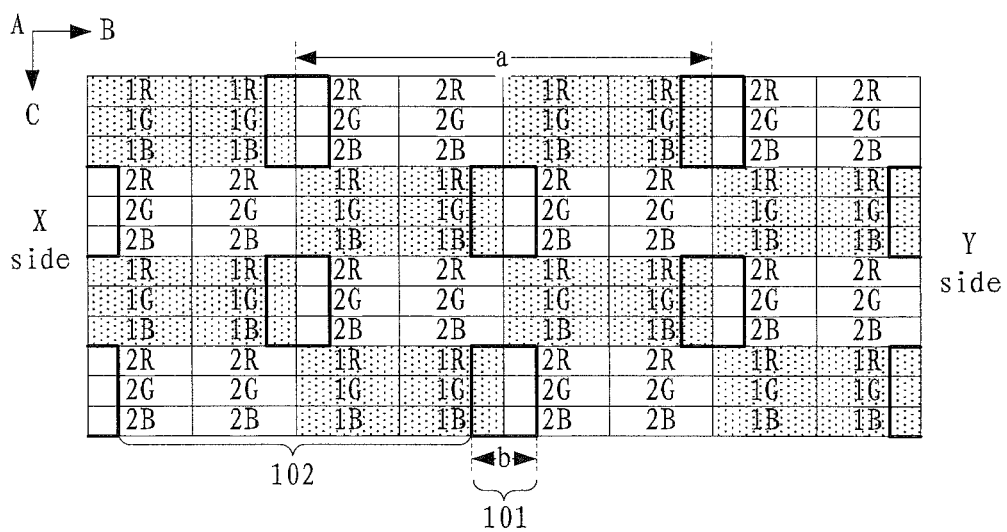
FIG. 10 is a plan view of these sub-pixels in a double-vision display device according to an embodiment of the present invention.

In accordance with a general inventive concept of the present invention, embodiments of the present invention provide a double-vision display device comprising a display panel and a grating, as shown in FIG. 10, the display panel includes a plurality of sub-pixels, and, the grating includes light shading regions 102 and light transmittance regions 101 alternately arranged in a first direction AB. A distance a between midlines of two adjacent ones of the light transmittance regions 101 in each row of the light transmittance regions 101 along the first direction AB is at least four times as large as a length of one of the sub-pixels along the first direction AB.

Compared with a conventional double-vision display device in which a distance between two adjacent ones of the light transmittance regions in the grating is a sum of width of two sub-pixels, the grating according to embodiment of the present invention is improved such that a distance a between midlines of two adjacent ones of the light transmittance regions 101 in each row of the light transmittance regions 101 along the first direction AB is at least four times as large as a length of one of the sub-pixels along the first direction AB. In order to drive the abovementioned double-vision display device, within every display subzone, each row of sub-pixels along the first direction AB includes at least two sub-pixels, that is, within every display subzone, there are at least two rows of sub-pixels along a second direction AC, in this way, even if a distance between a plane where the grating is in and a plane where the sub-pixels are in is increased, the sub-pixels seen from X side (or Y side) of the display device belong to the same display subzone when viewing the display device, such that, crosstalk issue raised by increment of the distance between the plane where the grating is in and the plane where the sub-pixels is avoided, normal displaying of the image within every display subzone is ensured, and, a greater distance between the plane where the grating is in and the plane where the sub-pixels are in is achieved so that a substrate having a greater thickness can be used for manufacturing the double-vision display device and thus difficulty of manufacturing the double-vision display device is greatly reduced.

Distance between the plane where the grating is in and the plane where the sub-pixels are in an embodiment can be set, preferably depending on various factors, e.g., pixels per inch (PPI) for the display panel, practical requirement for image displaying quality, size of the sub-pixels, etc. The distance between the plane where the grating is in and the plane where the sub-pixels are in preferably is greater than 200 μm, more preferably is 200 μm~350 μm, such that the display device can be manufactured with substrate having a relative greater thickness, which reduces difficulty of manufacturing the double-vision display device while ensuring image effect of the double-vision displaying and avoiding crosstalk among the displaying images. Of course, in the double-vision display device according to other embodiments of the present invention, the distance between the plane where the grating is in and the plane where the sub-pixels are in also can be less than 200 μm while ensuring image effect of the double-vision displaying and avoiding crosstalk among the displaying images, however, difficulty of manufacturing such double-vision display device is increased.

In the double-vision display device according to the present embodiment of the present invention, the light shading regions 102 and the light transmittance regions 101 of the grating may be alternately arranged in the second direction AC perpendicular to the first direction AB. In this way, first and second display subzones for displaying different views in the display panel are distributed in a more uniform manner in the display device, which helps to improve image displaying quality.

In the double-vision display device according to other embodiments of the present invention, the light shading regions 102 and the light transmittance regions 101 of the grating may be not alternately arranged in the second direction AC. That is, those regions of the grating that are in the second direction AC are either light shading regions 102 or light transmittance regions 101, and, the light shading regions 102 and the light transmittance regions 101 are respectively arranged in the second direction AC. Configurations of the grating and of the display device in such embodiments will be achieved for those skilled in the art by modifying the configurations shown in FIG. 10, and will not be described here.

It should be mentioned that, whether or not the light shading regions 102 and the light transmittance regions 101 of the grating are alternately arranged in the second direction AC, the length of the light transmittance region 101 in the second direction AC is the same as that of the display subzone in the second direction AC, in the grating.

It should also be mentioned that, no specific orientations are limited for "a/the first direction" and "a/the second direction". In a common arrangement for these sub-pixels in a display panel, "a/the first direction" may be specifically a direction of row of an arrangement of these sub-pixels while "a/the second direction" may be specifically a direction of column of an arrangement of these sub-pixels. In addition, the X side and the Y side are the two opposite sides of the display device.

The distance a between midlines of two adjacent ones of the light transmittance regions 101 in each row of the light transmittance regions 101 along the first direction AB is preferably four to eight times as large as the length of one of the sub-pixels along the first direction AB, such that, crosstalk issue raised by increment of the distance between the plane where the grating is located and the plane where the sub-pixels are located is avoided while the displaying quality is ensured. More preferably, the distance a between midlines of two adjacent ones of the light transmittance regions 101 in each row of the light transmittance regions 101 along the first direction AB is four times as large as the length of one of the sub-pixels along the first direction AB, such that, crosstalk issue raised by increment of the distance between the plane where the grating is located and the plane where the sub-pixels are located is avoided while the displaying quality is further improved.

Moreover, in the grating, a length of each of the light transmittance regions 101 in the second direction AC is three to six times as large as that of one of the sub-pixels in the second direction AC.

Colors contained in the sub-pixels of the display panel can preferably be arranged as shown in FIG. 10. In the plurality of sub-pixels, colors contained in each row of the sub-pixels along the second direction AC include all the colors (e.g., red (R), green (G) and blue (B)) required for displaying of the double-vision display device, and in the plurality of sub-pixels, colors contained in each row of the sub-pixels along the first direction AB are the same.

It should be mentioned that, the display panel in the display device according to the embodiments of the present invention may be any products or components having a displaying function, such as, liquid crystal panel, electronic paper, OLED panel, tablet PC, TV, displayer, notebook PC, etc.

A method for driving a double-vision display device is also provided according to the embodiments of the present invention, especially, for driving the double-vision display device according to the embodiments of the present invention. The method comprises: applying a display signal that belongs to a first view and a display signal that belongs to a second view to the double-vision display device, such that, the double-vision display device includes first and second display subzones alternately arranged in a first direction, wherein, each of the display subzones includes a plurality of sub-pixels; and, within every display subzone, each row of sub-pixels along the first direction includes at least two sub-pixels.

The display signal that belongs to the first view is used for driving the first display subzones to display the first view, and the display signal that belongs to the second view is used for driving the second display subzones to display the second view.

Compared with a conventional method for driving a double-vision display device in which there is only one row of the sub-pixels along the second direction in every display subzone, in the drive method according to the embodiments of the present invention, within every display subzone, each row of sub-pixels along the first direction includes at least two sub-pixels; that is, there are at least two rows of sub-pixels along a second direction within every display subzone. Since a distance between midlines of two adjacent ones of the light transmittance regions in each row of the light transmittance regions along the first direction is at least four times as large as a length of one of the sub-pixels along the first direction, even if a distance between a plane where the grating is located and a plane where the sub-pixels of the display panel are located is increased in the driven double-vision display device, when viewing the display device from one side (or the other side opposing to the one side), while one row of sub-pixels that belongs to the first display subzone (or the second display subzone) and is exposed from the light transmittance region of the grating is seen, sub-pixels that are adjacent to the row of sub-pixels at the other side (or the one side) may also be seen, however, both the sub-pixels and the one row of sub-pixels belong to the first display subzone (or the second display subzone), in this way, crosstalk issue, among the first display subzones and the second display subzones, raised by increment of the distance between the plane where the grating is located and the plane where the sub-pixels are located is avoided, normal displaying of the image within the first display subzone (or the second display subzone) is ensured. Accordingly, with the method for driving a double-vision display device according to the embodiments of the present invention, a greater distance between the plane where the grating is located and the plane where the sub-pixels are located is achieved while the normal double-vision displaying function is ensured. That is, a substrate having a greater thickness can be used in manufacture of the display device according to the embodiments of the present invention, as a result, use of the substrate having a greater thickness can reduce not only difficulty of process for thinning the substrate but also difficulty of process for manufacturing various elements on the substrate.

Specifically, take the abovementioned display device having double-vision performance (from both X-side and Y-side) as an example, the driving method comprises applying a display signal that belongs to a first view to sub-pixels within a first display subzone while applying a display signal that belongs to a second view to sub-pixels within a second display subzone of the double-vision display device, so as to form these display subzones matching with those light transmittance regions and light shading regions in the grating.

When viewing the display device from X side, one row of sub-pixels that is closer to X side than Y side within the second display subzone and is exposed from the light transmittance region of the grating is seen, meanwhile, another row of sub-pixels that is closer to Y side than X side within the second display subzone may be also seen due to the large distance between the plane where the grating is in and the plane where the sub-pixels are in. As a result, all the sub-pixels to be seen are those belonging to the second display subzones, thereby resulting in images displayed within the second display subzone to be seen clearly.

When viewing the display device from Y side, one row of sub-pixels that is closer to Y side than X side within the first display subzone and is exposed from the light transmittance region of the grating is seen, meanwhile, another row of sub-pixels that is closer to X side than Y side within the first display subzone may be also seen due to the large distance between the plane where the grating is in and the plane where the sub-pixels are in. As a result, all the sub-pixels to be seen are those belonging to the first display subzones, thereby resulting in images displayed within the first display subzone to be seen clearly.

Take a common display device having PPI of 180~300 as an example, with the double vision display device and the method for driving the same according to the present embodiment of the present invention, the distance between the plane where the grating is in and the plane where the sub-pixels are in can be set to be greater than 200 µm while the normal double-vision displaying function is ensured. That is, a substrate having a thickness greater than 200 µm can be used in manufacture of this display device. Compared with this, for the double-vision display device in the prior art, a substrate having a thickness less than 200 μm has to be used for achieving the normal double-vision displaying function. Of course, a substrate having a thickness less than 200 μm can also be used in manufacture of the double-vision display device according to the embodiment of the present invention, which can also avoid the crosstalk issue occurred on the double vision displaying images, although there is increased difficulty on manufacturing process.

In order to match with the arrangement of the light transmittance regions and the light shading regions in the grating, the first display subzones and the second display subzones are preferably alternately arranged in the second direction, while the light transmittance regions and the light shading regions in the grating are alternately arranged in the second direction.

Figure 2:
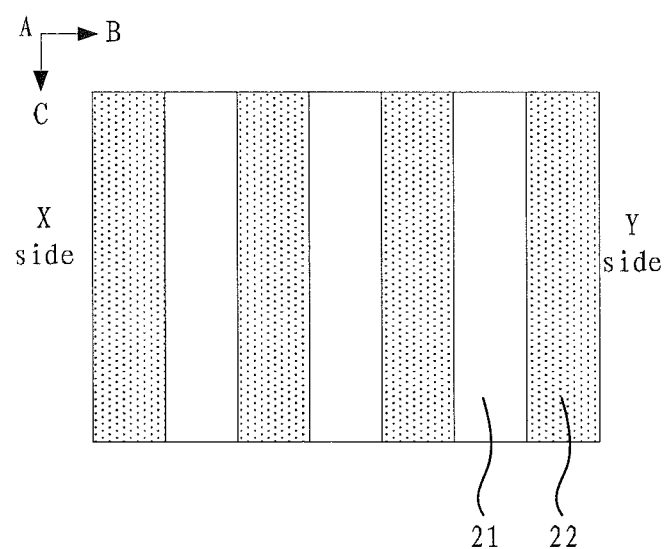
FIG. 2 is one arrangement diagram of these display subzones in a double-vision display device according to an embodiment of the present invention.
Figure 3:
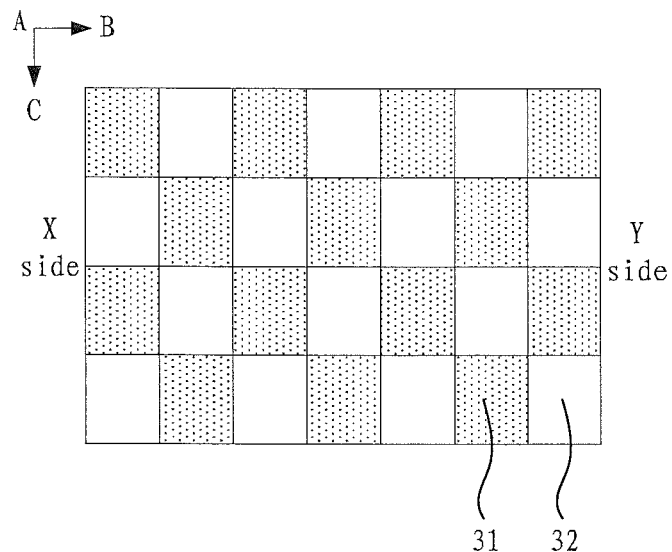
FIG. 3 is another arrangement diagram of these display subzones in a double-vision display device according to an embodiment of the present invention.

Specific these display subzones in the display device is preferably arranged as shown in FIG. 2. In particular, these display subzones are arranged in a matrix manner, in which the first display subzones 21 and the second display subzones 22 are alternately arranged in the first direction AB. Preferably, the first display subzones 21 and the second display subzones 22 are also alternately arranged in the second direction AC. Referring to FIG. 3, the first display subzones 31 and the second display subzones 32 are arranged in one row along both the first direction and the second direction, such arrangement of the display subzones further improves image displaying quality.

In this display device, the sub-pixels within the display subzones may also be arranged in a matrix manner, in which, within every display subzone, one pixel is constituted by at least three adjacent sub-pixels in one row of sub-pixels along the second direction AC. That is, arrangement of the sub-pixels within the display subzones preferably is as follow. There are at least two rows of pixels parallel to the first direction AB, and each pixel in every row includes at least three sub-pixels arranged side by side in the second direction.

With such arrangement of the sub-pixels, these sub-pixels included in one pixel may present in different colors, that is, within every display subzone, these sub-pixels in every row along the second direction AC may contain the sub-pixels of all the colors required for image displaying. Moreover, the sub-pixels of various colors contained in every row along the second direction AC are preferably uniformly arranged. For example, take one pixel including a red (R) sub-pixel, a green (G) sub-pixel and a blue (B) sub-pixel as an example, the sub-pixels of various colors contained in every row along the second direction AC may be ordered as RGBRGB. In addition, within every display subzone, the colors contained in these sub-pixels in every row along the first direction AB are preferably the same.

Different arrangements of these sub-pixels in the display subzones can be used for the grating having the light transmittance regions 101 and the light shading regions 102 of various sizes.

In the present embodiment, a length of one display subzone in the first direction AB is a half of the distance a between midlines of two adjacent ones of the light transmittance regions 101 along the first direction AB, and, number of the sub-pixels included in one row of the sub-pixels of one display subzone in the first direction AB is a ratio of the length of one display subzone in the first direction AB to a length of one sub-pixel in the first direction AB. If a distance a between midlines of two adjacent ones of the light transmittance regions 101 in each row of the light transmittance regions 101 along the first direction is four to eight times as large as a length of one of the sub-pixels along the first direction, then, a length of one row of the sub-pixels along the first direction within one display subzone is two to four times as large as the length of one sub-pixel along the first direction, that is, one row of the sub-pixels along the first direction within one display subzone includes two to four sub-pixels. More specifically, if a distance a between midlines of two adjacent ones of the light transmittance regions 101 in each row of the light transmittance regions 101 along the first direction is four times as large as a length of one sub-pixel along the first direction, then, a length of one row of the sub-pixels along the first direction within one display subzone is two times as large as the length of one sub-pixel along the first direction, that is, one row of the sub-pixels along the first direction within one display subzone includes two sub-pixels.

A length of one display subzone in the second direction AC is preferably the same as a length of one light transmittance region 101 in the second direction AC, and, number of the sub-pixels included in one row of the sub-pixels of one display subzone in the second direction AC is a ratio of the length of one display subzone in the second direction AC to a length of one sub-pixel in the second direction AC. If a length of each light transmittance region 101 in the second direction AC is three to six times as large as a length of one sub-pixel along the second direction AC, then, a length of each display subzone along the second direction AC is also three to six times as large as the length of one sub-pixel along the second direction AC, that is, one row of the sub-pixels along the second direction AC within each display subzone includes three to six sub-pixels.

In particular, provided that a length of one sub-pixel in the first direction AB is named as first length and a length of one sub-pixel in the second direction AC is named as second length. If a is a length being four times as large as the first length, and, b is a length being three times as large as the second length, then, one row of the sub-pixels along the first direction AB within one display subzone includes two sub-pixels, one row of the sub-pixels along the second direction AC within one display subzone includes three sub-pixels; if a is a length being four times as large as the first length, and, b is a length being six times as large as the second length, then, one row of the sub-pixels along the first direction AB within one display subzone includes two sub-pixels, one row of the sub-pixels along the second direction AC within one display subzone includes six sub-pixels; if a is a length being four times as large as the first length, and, b is a length being five times as large as the second length, then, one row of the sub-pixels along the first direction AB within one display subzone includes two sub-pixels, one row of the sub-pixels along the second direction AC within one display subzone includes five sub-pixels; and so on.

Figure 4:
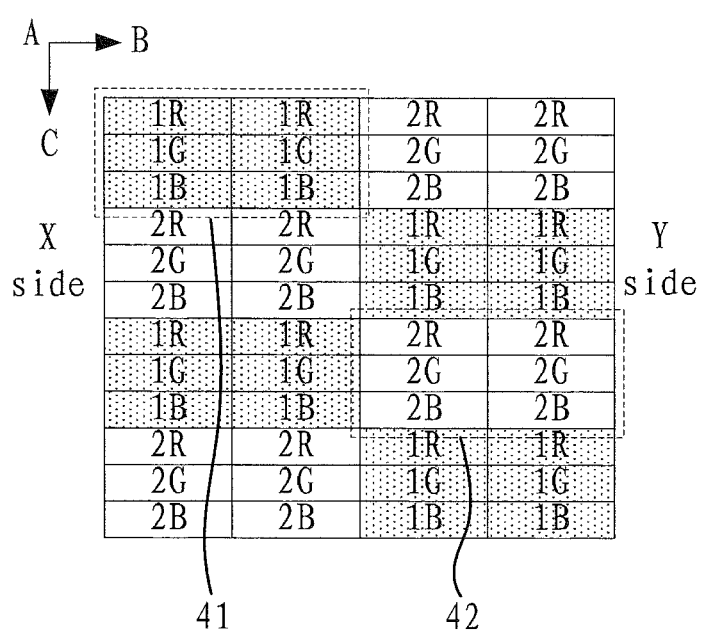
FIG. 4 is a view showing a first implementation of a first arrangement of these sub-pixels in a double-vision display device according to an embodiment of the present invention.
Figure 5:
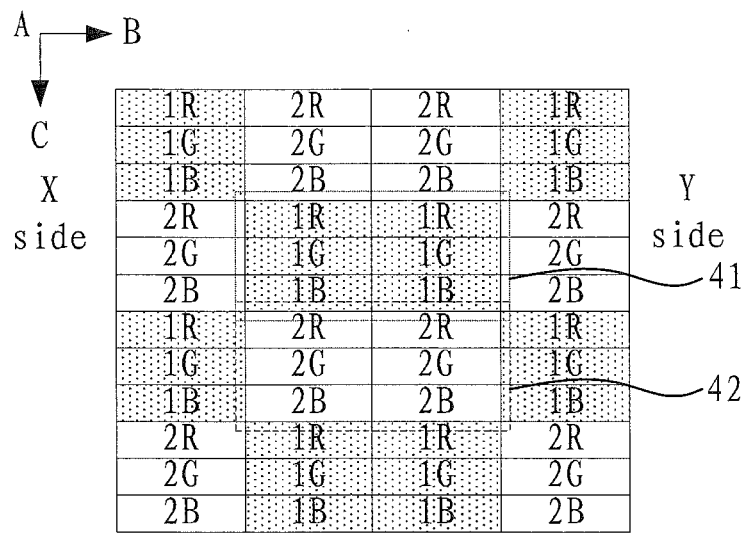
FIG. 5 is a view showing a second implementation of the first arrangement of these sub-pixels in the double-vision display device according to an embodiment of the present invention.
Figure 6:
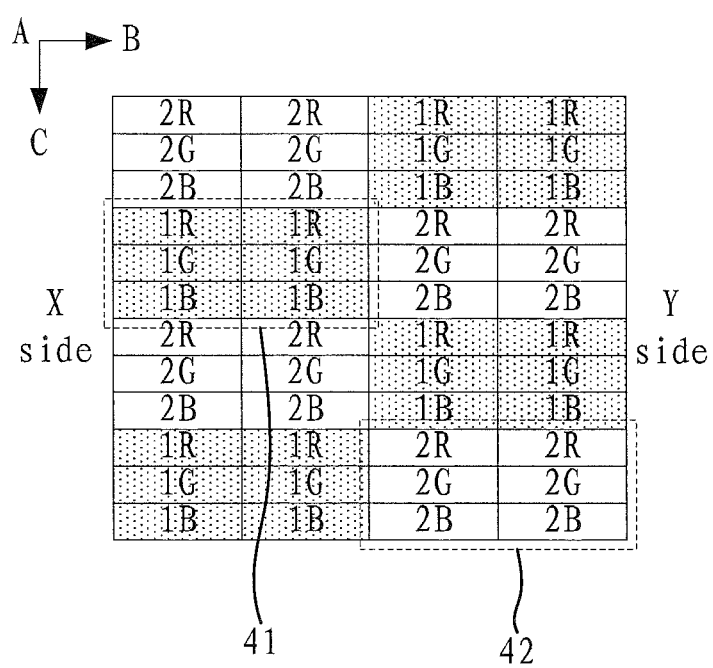
FIG. 6 is a view showing a third implementation of the first arrangement of these sub-pixels in the double-vision display device according to an embodiment of the present invention.

As to arrangement of the sub-pixels within the display subzone when being driven, for example, provided that one row of the sub-pixels along the first direction AB within one display subzone includes two sub-pixels, one row of the sub-pixels along the second direction AC within one display subzone includes three sub-pixels, and first display subzone and second display subzone are alternately arranged both in the first direction AB and in the second direction AC, then, the whole arrangement of the sub-pixels in the display device is shown in FIG. 4, in which, number 41 denotes first display subzone, number 42 denotes second display subzone, sub-pixel noted by "1R" is a red sub-pixel that belongs to the first display subzone, sub-pixel noted by "1B" is a blue sub-pixel that belongs to the first display subzone, sub-pixel noted by "1G" is a green sub-pixel that belongs to the first display subzone, sub-pixel noted by "2R" is a red sub-pixel that belongs to the second display subzone, sub-pixel noted by "2B" is a blue sub-pixel that belongs to the second display subzone, and, sub-pixel noted by "2G" is a green sub-pixel that belongs to the second display subzone. In the abovementioned arrangement, the row of sub-pixels that is closer to X side than Y side within the first display subzone 41 is as starting pixels. In another embodiment of the present invention, the row of sub-pixels that is closer to Y side than X side within the first display subzone 41 is as starting pixels, as shown in FIG. 5. In yet another embodiment of the present invention, the row of sub-pixels that is closer to X side than Y side within the second display subzone 42 is as starting pixels, as shown in FIG. 6. In still another embodiment of the present invention, the row of sub-pixels that is closer to Y side than X side within the second display subzone 42 is as starting pixels, as shown in FIG. 7.

Figures 7, 8:
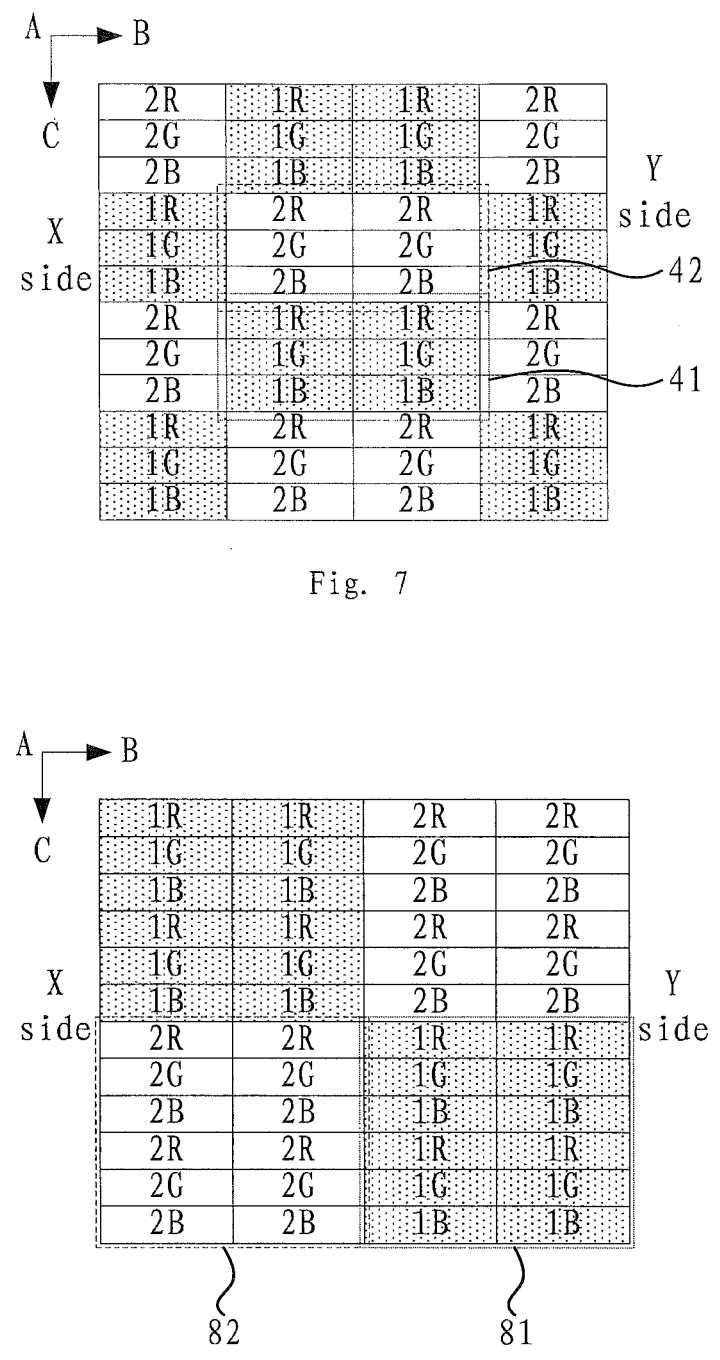

Provided that one row of the sub-pixels along the first direction AB within one display subzone includes two sub-pixels, one row of the sub-pixels along the second direction AC within one display subzone includes six sub-pixels, and first display subzone and second display subzone are alternately arranged both in the first direction AB and in the second direction AC, then, the whole arrangement of the sub-pixels in the display device is shown in FIG. 8, in which the first display subzone 81 and the second display subzone 82 include two rows of the sub-pixels parallel to the second direction AC. If one pixel includes three sub-pixels, R, G, and B sub-pixels, then each row of the sub-pixels includes two pixels. In the abovementioned arrangement of the sub-pixels, the row of sub-pixels that is closer to X side than Y side within the first display subzone 81 is as starting pixels. In another embodiment of the present invention, any other row of sub-pixels that is paralleled to the second direction AC may also be as starting pixels, and will not be described here.

Figure 9:
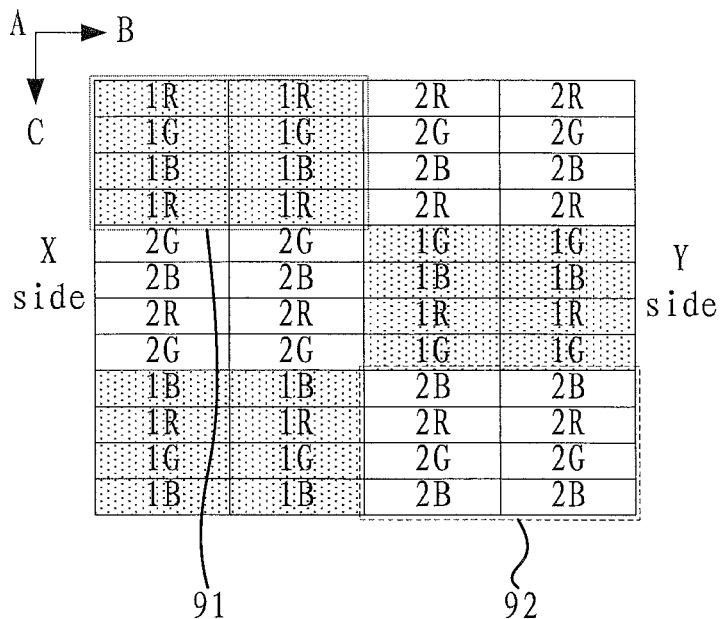
FIG. 9 is a third arrangement diagram of these sub-pixels in a double-vision display device according to an embodiment of the present invention.

Provided that one row of the sub-pixels along the first direction AB within one display subzone includes two sub-pixels, one row of the sub-pixels along the second direction AC within one display subzone includes four sub-pixels, and first display subzone and second display subzone are alternately arranged both in the first direction AB and in the second direction AC, then, the whole arrangement of the sub-pixels in the display device is shown in FIG. 9, in which the first display subzone 91 and the second display subzone 92 include two rows of the sub-pixels parallel to the second direction AC, and each row of the sub-pixels includes four sub-pixels.

If three colors R, G, B are required for image displaying on the display device, then each row of the four sub-pixels should include sub-pixels of the three colors R, G, B. In the abovementioned arrangement of the sub-pixels, the row of sub-pixels that is closer to X side than Y side within the first display subone 91 is as starting pixels. In another embodiment of the present invention, any other row of sub-pixels that is paralleled to the second direction AC may also be as starting pixels, and will not be described here.

It should be mentioned that, although only several exemplary sub-pixel arrangements, such as, those in which one row of the sub-pixels along the first direction AB within one display subzone includes two sub-pixels while one row of the sub-pixels along the second direction AC within one display subzone includes three, six or four sub-pixels, are provided in these abovementioned embodiments according to the present invention, in other sub-pixel arrangements, one row of the sub-pixels along the first direction AB within one display subzone may include more than two sub-pixels while one row of the sub-pixels along the second direction AC within one display subzone may include other number of the sub-pixels.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A double-vision display device, comprising:
   a display panel that includes a plurality of sub-pixels; and
   a grating that includes light shading regions and light transmittance regions alternately arranged in a first direction;
   wherein a distance between midlines of two adjacent ones of the light transmittance regions in each row of the light transmittance regions along the first direction is at least four times as large as a length of one of the sub-pixels along the first direction;
   wherein the double-vision device includes first and second display subzones alternatively arranged in the first direction;
   wherein each of the display subzones includes the plurality of sub-pixels;
   wherein a length of the light transmittance region of the grating in a second direction perpendicular to the first direction is the same as a length of the display subzone in the second direction;
   wherein the first display subzones and the second display subzones are alternately arranged in the secodn direction;
   wherein, within every display subzone, each row of sub-pixels along the first direction includes at least two sub-pixels; and
   where, within every display subzone, each row of sub-pixels in the second direction comprises three to six sub-pixels.

2. The double-vision display device according to claim 1, wherein the light shading regions and the light transmittance regions are alternately arranged in the second direction.

3. The double-vision display device according to claim 1, wherein a distance between a plane where the grating is located and a plane where the plurality of sub-pixels are located is greater than 200 μm.

4. The double-vision display device according to claim 1, wherein the distance between midlines of two adjacent ones of the light transmittance regions in each row of the light transmittance regions along the first direction is four to eight times as large as the length of one of the sub-pixels along the first direction.

5. The double-vision display device according to claim 4, wherein the distance between midlines of two adjacent ones of the light transmittance regions in each row of the light transmittance regions along the first direction is four times as large as the length of one of the sub-pixels along the first direction.

6. The double-vision display device according to claim 2, wherein a length of each of the light transmittance regions along the second direction is three to six times as large as a length of one of the sub-pixels along the second direction.

7. The double-vision display device according to claim 6, wherein the length of each of the light transmittance regions along the second direction is three times as large as the length of one of the sub-pixels along the second direction.

8. The double-vision display device according to claim 1, wherein, among the plurality of sub-pixels, colors contained in each row of the sub-pixels along the second direction include all the colors required for displaying of the double-vision display device; and wherein, among the plurality of sub-pixels, the colors contained in each row of the sub-pixels along the first direction are the same.

9. A method for driving a double-vision display device according to claim 1, the method comprising:
applying a display signal that belongs to a first view and a display signal that belongs to a second view to the double-vision display device and
wherein the display signal that belongs to the first view is used for driving the first display subzones to display the first view, and the display signal that belongs to the second view is used for driving the second display subzones to display the second view.

10. The method according to claim 9, wherein, within every display subzone, each row of sub-pixels in the first direction comprises two to four sub-pixels.

11. The method according to claim 10, wherein, within every display subzone, each row of sub-pixels in the first direction comprises two sub-pixels.

12. The method according to claim 9, wherein, within every display subzone, each row of sub-pixels in the second direction comprises three sub-pixels.

* * * * *